United States Patent

[11] 3,619,627

[72] Inventor Fred C. Bolick, Jr.
Atlanta, Ga.
[21] Appl. No. 852,970
[22] Filed Aug. 18, 1969
[45] Patented Nov. 9, 1971
[73] Assignee Lanier Electronic Laboratory, Inc.
Altanta, Ga.
Continuation of application Ser. No. 727,784, May 9, 1968, now abandoned.

[54] RECORDING-REPRODUCING SYSTEM WITH PHOTOELECTRIC TAPE LOOP SENSING
10 Claims, 2 Drawing Figs.

[52] U.S. Cl. .......... 250/219 L, 226/43 R, 356/199 R
[51] Int. Cl. .......... G01n 21/30
[50] Field of Search .......... 356/199; 250/219 L; 226/45, 118, 120, 43, 44

[56] References Cited

UNITED STATES PATENTS

| | | | |
|---|---|---|---|
| 3,187,165 | 6/1965 | Turner et al. | 235/61.115 |
| 3,229,927 | 1/1966 | Cohler | 250/219 L |
| 3,251,048 | 5/1966 | Killen | 250/219 L |
| 3,258,213 | 6/1966 | Fronckowiak | 226/45 X |
| 3,261,564 | 7/1966 | Sharpe | 250/219 L |
| 3,310,250 | 3/1967 | Michiels | 250/219 L |
| 3,354,318 | 11/1967 | Wahlstrom | 250/219 L |
| 3,400,895 | 10/1968 | Cole | 250/219 L |
| 3,415,434 | 12/1968 | Bolick | 226/25 |

*Primary Examiner*—James W. Lawrence
*Assistant Examiner*—D. C. Nelms
*Attorney*—Jones & Thomas

ABSTRACT: What is disclosed is a tape control device for a recording-reproducing system in which a tape is pulled from a tape magazine by a tape driving device. The tape control device includes a radiation means for emitting energy to which the tape is opaque and a control means responsive to the energy from the radiation means for rendering the tape driving device inoperative when further operation of the tape driving device will cause tape breakage. The radiation means and the control means are positioned relative to each other so that in some positions of the tape within the tape magazine the tape is between the radiation means and the control means while in other positions of the tape within the tape magazine the tape is not between the radiation means and the control means.

INVENTOR.
Fred C. Bolick, Jr.
BY
Jones & Thomas
ATTORNEYS

RECORDING-REPRODUCING SYSTEM WITH PHOTOELECTRIC TAPE LOOP SENSING

This is a continuation of Ser. No. 727,784 filed May 9, 1968 now abandoned.

BACKGROUND OF THE INVENTION

1. Field of the Invention

This invention relates to the control of the linear movement of a tape, and more particularly to a tape control device for discontinuing motion of a tape within a tape magazine in order to prevent tape breakage.

2. Description Of The Prior Art

A recording-reproducing system using an endless tape for recording information frequently provides for the motion of the tape to be independently controlled by each of a plurality of tape driving devices. Moreover, each tape driving device generally has the capability of imparting motion to the tape in any one of a plurality of directions. In a recording-reproducing system of this type, there is an inherent danger of tape breakage because of the probability that the plurality of tape driving devices will attempt to impart motion to the tape in opposite directions with the tape taut between them.

Accordingly, a recording-reproducing system of this type has generally included a tape control device operative to render one or more tape driving devices in whole or in part inoperative when the tape is in a taut position between tape driving devices which could result in tape breakage with continued unrestricted operation of the tape driving devices. A frequent problem with a prior art tape control device used with a recording-reproducing system is that the tape control device frequently fails to operate and prevent tape breakage. Another problem is that having become operative, the prior art tape control device frequently fails to return to inoperative condition so that continued use may be made of the recording-reproducing system.

These and other problems with a prior art tape control device are avoided by the tape control device described in U.S. Pat. Application Ser. No. 553,506, filed on May 27, 1966, by Fred C. Bolick, Jr. for a "TAPE CONTROL DEVICE" now U.S. Pat. No. 3,415,434. In this tape control device the substantially horizontal slideable movement of a pin member is used to render a tape driving device selectively inoperative.

This tape control device has been found to be reliable in operation and in returning to inoperative condition subsequent in operation. However, this tape control device is similar to a prior art tape control device in that it uses a pin member which must be engaged by the tape and which frequently causes damage to the tape if the pin member is not perfectly smooth or if dirt or debris is between the pin member and the tape when the tape engages the pin member.

SUMMARY OF THE INVENTION

The invention disclosed herein avoids damage to a tape from a pin member and other problems encountered with a prior art tape control device in that it provides a tape control device which is operatively responsive to the position of a tape within a tape magazine but which does not require the engagement of a pin member or similar mechanical component by the tape. Moreover, the tape control device disclosed herein is reliable in operating to render a tape driving device inoperative and is reliable in returning to inoperative condition so that continued use may be made of a recording-reproducing system.

These improvements in a tape control device are provided by a tape control device having a radiation means for emitting energy to which the tape is opaque and a control means responsive to the energy from the radiation means for rendering a tape driving device inoperative. The radiation means and the control means are positioned relative to each other so that energy from the radiation means reaches the control means only when substantially all of the tape has been removed from the tape magazine by operation of one or more tape driving devices.

BRIEF DESCRIPTION OF THE DRAWING

These and other features and advantages of the invention will be more clearly understood from the following detailed description and the accompanying drawing in which like characters designate corresponding parts throughout and in which.

DESCRIPTION OF AN EMBODIMENT

These figures and the following detailed description disclose a specific embodiment of the invention. However, the invention is not limited to the details disclosed since the invention may be embodied in other equivalent forms.

The invention disclosed herein may be best understood as a tape control device for controlling the motion of an endless tape 10 in a recording-reproducing system S having a plurality of independently operable tape driving devices 11 and 12 each of which is operative to impart motion to the tape 10. Recording-reproducing systems such as the recording-reproducing system S are well known to those skilled in the art and it is for this reason that the recording-reproducing system S is shown in FIG. 1 with only enough detail for an understanding of the invention disclosed herein.

Figure 1:
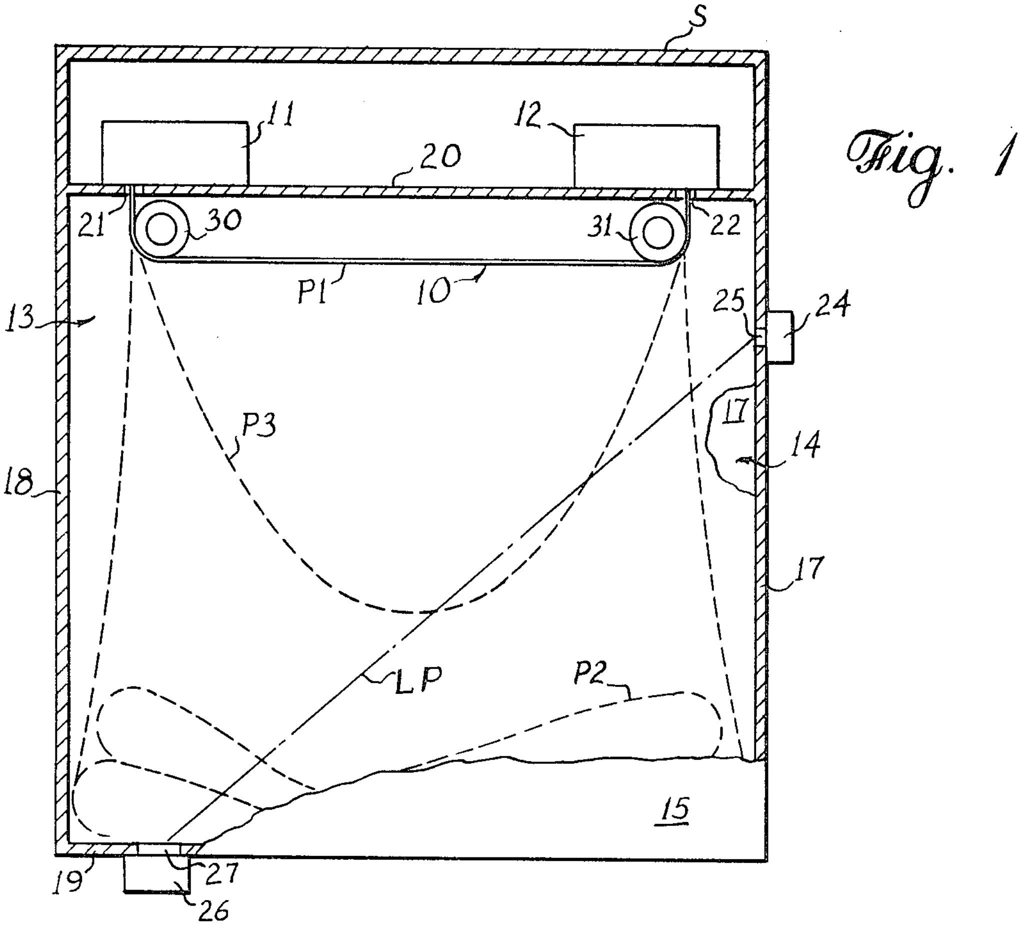
FIG. 1 is a schematic presentation of a recording-reproducing system in which an embodiment of the tape control device disclosed herein is used.

From FIG. 1 it will be seen that the recording-reproducing system S includes a first tape magazine 13 and a second tape magazine 14 positioned to receive the tape 10 as it passes between the tape driving device 11 and the tape driving device 12. The tape magazines 13 and 14 are formed in part by parallel walls 15, 16, and 17 with the parallel wall 16 serving as a common wall for the tape magazines 13 and 14.

In addition, the tape magazines 13 and 14 have common end walls 17 and 18, a common bottom member 19, and a common coverplate 20 on which the tape driving devices 11 and 12 are mounted. It will be understood by those skilled in the art that through an aperture 21 in the coverplate 20 adjacent the tape driving device 11, the tape driving device 11 is operative to remove the tape 10 from the tape magazine 13 and deposit the tape 10 in the tape magazine 14 or to remove the tape 10 from the tape magazine 14 and deposit the tape 10 in the tape magazine 13. Similarly, through an aperture 22 in the coverplate 20 adjacent the tape driving device 12, the tape driving device 12 is operative to remove the tape 10 from the tape magazine 13 and deposit the tape 10 in the tape magazine 14 or to remove the tape 10 from the tape magazine 14 and deposit the tape 10 in the tape magazine 13.

It will also be understood by those skilled in the art that the tape driving devices 11 and 12 are independently operative to provide the plurality of motions of the tape 10 required to move the tape 10 between the tape magazines 13 and 14. However, it will be understood that when the tape 10 in a tape magazine 13 or 14 is in that taut position between rollers 30 and 31 indicated as P1 in FIG. 1, breakage of the tape 10 will frequently occur when a tape driving device 11 or 12 is operative to pull the tape 10 from a tape magazine 13 or 14 while the other tape driving device 11 or 12 is holding the tape 10 stationary or is also being operated to pull the tape 10 from a tape magazine 13 or 14. It is toward the prevention of the breakage of the tape 10 by the operation of a tape driving device 11 or 12 when the tape 10 is in a taut position such as the position P1 that the invention disclosed herein is directed.

That embodiment of the tape control device which is disclosed herein comprises a radiation means 24 which is positioned on the end wall 17 and which is for emitting energy to which the tape 10 is opaque through an aperture 25 into the tape magazine 13 and a control means 26 which is positioned on the bottom member 19 to receive the energy emitted by the radiation means 24 through an aperture 27 and which is for controlling the operation of the tape driving device 11 or the tape driving device 12 or of both the tape driving device 11 and the tape driving device 12 in response to energy from the radiation means 24. Since the tape 10 customarily used in a recording-reproducing system S is opaque to light, the radiation means 24 is conveniently simply a light source for emitting light through the aperture 25 into the tape magazine 13 and along the dashed line path LP and the control means 26 is conveniently simply a photoelectric cell or similar electrical device responsive to light passing through the aperture 27 and arranged to close an electrical circuit when light is impinging upon it and to open an electrical circuit when no light is impinging upon it.

Figure 2:
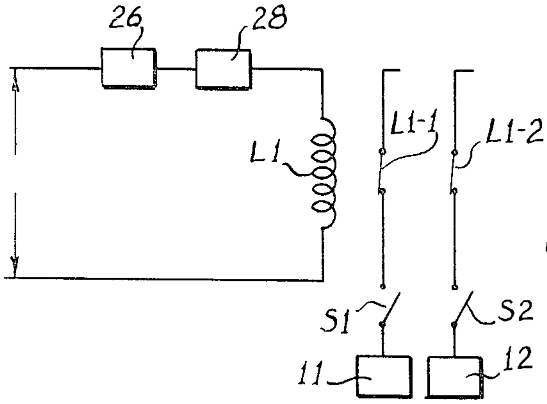
FIG. 2 is a schematic diagram showing a portion of a circuit arrangement for a recording-reproducing system in which an embodiment of the tape control device disclosed herein is used.

A variety of arrangements of the control means 26 in a circuit to control the operation of a tape driving device 11 or a tape driving device 12 or of both a tape driving device 11 and a tape driving device 12 will be readily apparent to those skilled in the art. FIG. 2 shows one such arrangement with the control means 26 in series with the coil of a relay L1 having its normally closed contacts L1-1 in series with a switch S1 which when closed provides a mode of operation of the tape driving device 11 that removes the tape 10 from the tape magazine 13 and its normally closed contacts L1-2 in series with a switch S2 which when closed provides a mode of operation of the tape driving device 12 that removes the tape 10 from the tape magazine 13.

OPERATION

Operation of the tape control device disclosed herein will be understood when it is remembered that the tape 10 has a plurality of positions within the tape magazine 13. The usual and normal position of the tape 10 in the tape magazine 13 is that generally indicated as P2 in FIG. 1 and in which a length of the tape 10 is resting on the bottom member 19 of the tape magazine 13 with additional lengths of the tape 10 in one or more layers above the bottom member 19.

When the tape 10 is in the position P2 or in substantially any other position which places the tape 10 in the tape magazine 13 in or below the position P3 shown in FIG. 1, the tape 10 prevents light or other energy to which the tape 10 is opaque from passing from the radiation means 24 to the control means 26 and the control means 26 does not render either the tape driving device 11 or the tape driving device 12 inoperative in any mode of operation. However, when the tape 10 within the tape magazine 13 is moved to a position above the position P3, the light or other energy being emitted by the radiation means 24 impinges upon the control means 26 and with the control means 26 in a circuit arrangement such as that shown in FIG. 2, the control means 26 renders the tape driving device 11 and the tape driving device 12 inoperative to move the tape 10 into a position P1 at which breakage of the tape 10 is likely to occur.

It will be understood that between a position of the tape 10 above the position P3 at which light or other energy from the radiation means 24 impinges upon the control means 26 and the position P1 at which the tape 10 is substantially taut between the first tape driving device 11 and the second tape driving device 12 there are a plurality of intermediate positions of the tape 10 through which the tape 10 may be moved without breakage of the tape 10 occuring. In order to permit the movement of the tape 10 within the tape magazine 13 through this plurality of intermediate positions and increase the availability of the tape 10, an embodiment of the invention may include a time delay element 28 in series with the control means 26 so that the control means 26 does not render any mode of operation of the tape driving device 11 or the tape driving device 12 inoperative for a predetermined interval of time after light or other energy from the radiation means 24 impinges upon the control means 26. The duration of this time interval is selected so that the operation of the tape driving device 11 and the tape driving device 12 together to remove tape 10 from the tape magazine 13 throughout the interval of time will only move the tape 10 from the position P3 to the position P1 before the tape driving device 11 and the tape driving device 12, are rendered inoperative in those modes of operation which would cause breakage of the tape 10.

From the foregoing description of an embodiment of the tape control device disclosed herein and of its operation, it will now be understood that the invention provides a tape control device which is reliably responsive to the position of a tape 10 within a tape magazine 13 and which renders a tape driving device 11 or 12 inoperative in that mode of operation that would cause breakage of the tape 10. It will also be understood that the tape control device prevents breakage of the tape 10 without requiring the tape 10 to engage a pin member or other structural element which could damage the tape 10. Furthermore, it will be understood by those skilled in the art that many variations may be made in the embodiments chosen for the purpose of illustrating the present invention without departing from the scope thereof as defined by the appended claims.

I claim:

1. In a recording-reproducing system, a first tape magazine, a second tape magazine, a continuous tape having a length in both said first tape magazine and said second tape magazine and having a plurality of positions in said first tape magazine including a taut position in which said tape is taut between a first aperture and a second aperture in said first tape magazine and a slack position in which said tape is slack between said first aperture and said second aperture, a first tape driving device operative to move said tape between said first tape magazine and said second tape magazine by motion of said tape through said first aperture, a second tape driving device operative to move said tape between said first tape magazine and said second tape magazine by motion of said tape through said second aperture, first switch means operative to cause said first tape driving device to move said tape through said first aperture from said first tape magazine into said second tape magazine, second switch means independent of said first switch means and operative to cause said second tape driving device to move said tape through said second aperture from said first tape magazine into said second tape magazine, radiation means for emitting energy to which said tape is opaque, and control means responsive to said energy impinging upon it for simultaneously rendering said first switch means and said second switch means inoperative, said radiation means and said control means being positioned relative to each other so that said tape in said first tape magazine is between said radiation means and said control means when said tape is in said slack position and so that said tape in said first tape magazine is displaced from between said radiation means and said control means when said tape is in said taut position.

2. The recording-reproducing system of claim 1 in which said control means renders both said first switch means and said second switch means inoperative after a predetermined interval of time subsequent to said energy impinging upon said control means.

3. The recording-reproducing system of claim 1 in which said radiation means emits said energy into said first tape magazine.

4. The recording-reproducing system of claim 1 in which said control means is responsive to said energy after said energy has traversed said first tape magazine.

5. The recording-reproducing system of claim 1 in which said radiation means emits said energy into said first tape magazine through a third aperture in said first tape magazine, and in which said control means receives said energy through a fourth aperture in said first tape magazine.

6. The recording-reproducing system of claim 5 in which said tape is between said first aperture and said second aperture in said slack position.

7. The recording-reproducing system of claim 1 in which said energy is light energy and said radiation means is a light source.

8. The recording-reproducing system of claim 7 in which said control means includes a photoelectric cell.

9. The recording-reproducing system of claim 8 in which said photoelectric cell is operatively in series with a relay having contacts in series with said first switch means.

10. The recording-reproducing system of claim 9 in which said relay has contacts in series with said second switch means.

* * * * *